United States Patent [19]

Bell

[11] 4,387,381
[45] Jun. 7, 1983

[54] OPTICAL RECORDING MEDIUM AND INFORMATION RECORD WITH TRACKING AID

[75] Inventor: Alan E. Bell, East Windsor, N.J.

[73] Assignee: RCA Corporation, New York, N.Y.

[21] Appl. No.: 273,250

[22] Filed: Jun. 12, 1981

[51] Int. Cl.³ .................. G01G 19/02; G01G 13/02
[52] U.S. Cl. .................. 346/135.1; 346/76 L; 369/275; 369/285
[58] Field of Search .................. 346/76 L, 135.1; 369/44, 275, 285

[56] References Cited

U.S. PATENT DOCUMENTS

| | | | |
|---|---|---|---|
| 4,038,524 | 7/1977 | Puech et al. .................. | 369/275 X |
| 4,090,031 | 5/1978 | Russell . | |
| 4,097,895 | 6/1978 | Spong .................. | 346/76 L X |
| 4,101,907 | 7/1978 | Bell et al. .................. | 346/135.1 |
| 4,176,377 | 11/1979 | Howe .................. | 346/76 L X |
| 4,216,501 | 8/1980 | Bell .................. | 346/135.1 X |

FOREIGN PATENT DOCUMENTS 165596  8/1973  Netherlands .................. 369/275

Primary Examiner—George H. Miller, Jr.
Attorney, Agent, or Firm—B. E. Morris

[57] ABSTRACT

An optical recording medium comprising a substrate, a light absorptive layer overlying the substrate, a buffer layer overlying the absorptive layer and a masking layer having slots therethrough overlying the buffer layer. The invention also includes an information record having information recorded in the absorptive layer as a series of regions of the absorptive layer, underlying the slots in the masking layer, whose optical properties differ from those of the remainder of the absorptive layer. The presence of the slots in this medium can provide a spatially varying recording sensitivity, track identification and a means for obtaining a radial tracking error signal.

12 Claims, 7 Drawing Figures

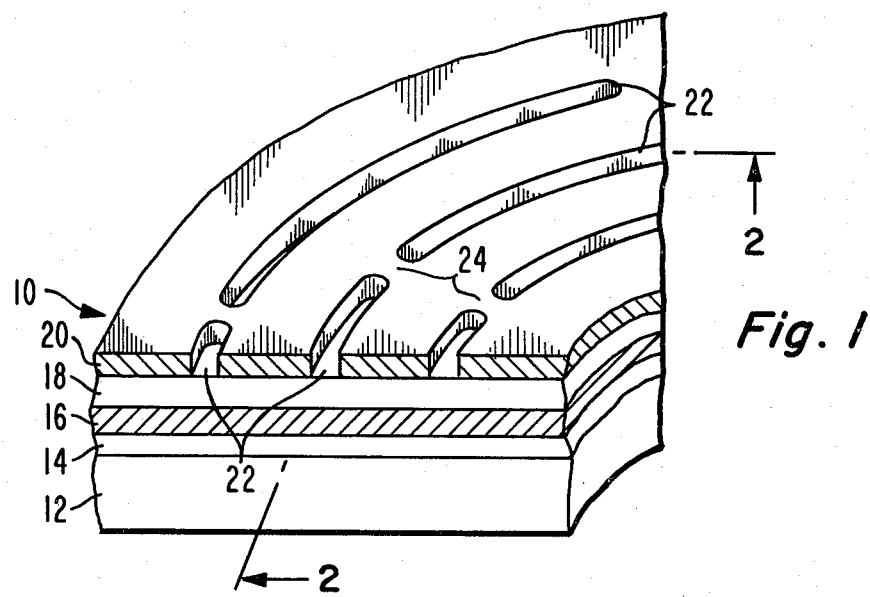
Fig. 1
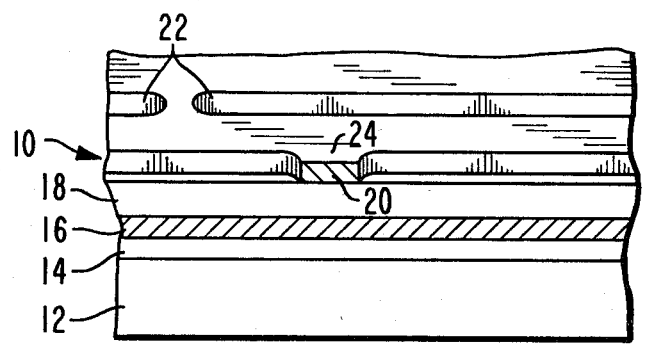
Fig. 2
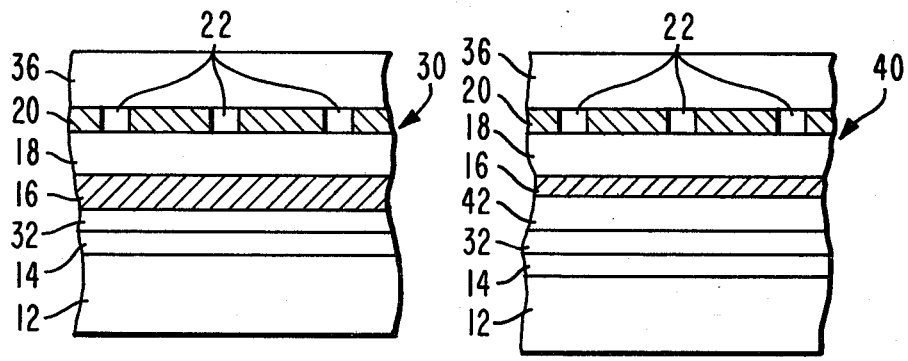
Fig. 3
Fig. 4

OPTICAL RECORDING MEDIUM AND INFORMATION RECORD WITH TRACKING AID

The Government has rights in this invention pursuant to a Government Contract.

The invention relates to an optical recording medium and information record having a radial tracking aid in the form of a masking layer, with slots therein, spaced apart from and overlying the layer in which information is recorded.

BACKGROUND OF THE INVENTION

Information may be recorded by exposing a portion of an optical recording medium to a recording light beam thereby changing the local optical properties of the exposed portion. The simplest such recording medium is a monolayer structure having a light absorptive layer overlying a substrate. Information is recorded by locally melting or ablating the light absorptive layer to change the transmission or reflectivity of the recording medium in the exposed portions.

Spong, in U.S. Pat. No. 4,097,895, issued June 27, 1978 which is entitled MULTILAYER OPTICAL RECORD and which is incorporated herein by reference, disclosed a bilayer optical recording medium which comprises a light reflective layer coated with a light absorptive layer. Bell, in U.S. Pat. No. 4,216,501, issued Aug. 5, 1980, which is entitled OPTICAL ANTI-REFLECTIVE INFORMATION RECORD and which is incorporated herein by reference, disclosed a trilayer optical recording medium having a transparent spacer layer interposed between the reflective and absorptive layers of the bilayer recording medium.

Such recording media are substantially uniform in their structural and optical properties prior to exposure and thus contain no means by which a track can be defined or followed prior to the recording of information. A recording medium having a pregrooved substrate which has been proposed to provide these means, does not have the flexibility for changes of the track arrangement after manufacture. An alternative approach in which a portion of the absorptive layer is thermally removed by a laser beam to form the track has this flexibility but is undesirable since it involves a modification of the absorptive layer itself. It would be desirable to have a medium in which tracks can be defined after the fabrication of the medium without perturbing the absorptive layer.

SUMMARY OF THE INVENTION

The invention is an optical recording medium comprising a substrate, a light absorptive layer overlying the substrate, a buffer layer overlying the light absorptive layer and a masking layer overlying the buffer layer. The masking layer has one or more slots extending therethrough.

The invention also includes an information record comprising the recording medium of the invention having information recorded in the light absorptive layer as a series of regions of the light absorptive layer, underlying the slots in the masking layer, whose optical properties differ from those of the remainder of the light absorptive layer.

BRIEF DESCRIPTION OF THE DRAWINGS

FIG. 1 is a schematic illustration of a radial cross-sectional view of the recording medium of the invention.

FIG. 2 is a cross-sectional view along the line 2—2 of FIG. 1.

FIGS. 3 and 4 are cross-sectional views of second and third embodiments of the recording medium of the invention.

DETAILED DESCRIPTION OF THE INVENTION

Figure 5:
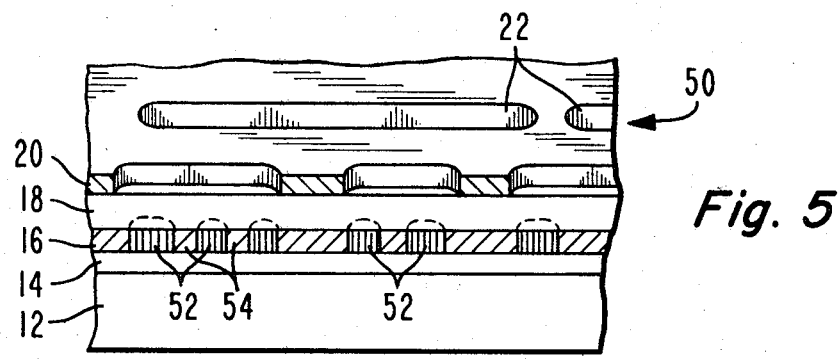
FIGS. 5, 6 and 7 are cross-sectional views of different embodiments of the information record of the invention.

In FIGS. 1 and 2 the recording medium 10 comprises a substrate 12, a subbing layer 14 overlying a surface of the substrate 12, an absorptive layer 16 overlying the subbing layer 14, a buffer layer 18 overlying the absorptive layer 16 and a masking layer 20 overlying the buffer layer 18. The masking layer 20 has slots 22 extending therethrough with regions 24 of the masking layer 20 between the slots.

The substrate 12 may be a glass or a plastic material such as polyvinylchloride or (poly)methylmethacrylate typically in the form of a disc. A subbing layer 14 in the form of a non-conformal coating of a plastic material, such as an epoxy or acrylic resin having a microscopically smooth surface, may be deposited on the surface of the substrate 12 prior to the deposition of the absorptive layer 16.

The absorptive layer 16 may be a material such as titanium, rhodium, tellurium, selenium, alloys containing tellurium or selenium, or other chalcogenide alloys. The thickness of the absorptive layer 16 is chosen so as to provide a balance between the reflectivity and absorption of this layer at the wavelength of a recording light beam. Typically this layer is between about 10 nanometers and about 40 nanometers thick.

The buffer layer 18 is substantially transparent at the wavelength of the recording and readout light beams and can be an inorganic material such as an oxide of silicon, aluminum, titanium, or magnesium or an organic material such as an acrylic or epoxy resin. This layer is typically between about 50 and about 1000 nanometers thick and is preferably between about 100 and about 500 nanometers thick. A preferred thickness is an integral multiple and one-half the wavelength of the recording light beam in the material of which the buffer layer is composed.

The masking layer 20 is absorptive of light at the wavelength at which the slots are formed and at the wavelength of the recording light beam and can be a metal such as titanium, rhodium, tellurium, selenium, alloys containing tellurium or selenium or other chalcogenide alloys. This layer should be thick enough to provide absorption of light at the wavelength of the recording light beam but thin enough so that the slots can be formed using a focused light beam either at the wavelength of the recording light beam or another wavelength and is typically between about 5 and about 150 nanometers thick.

The slots 22 may be formed by ablation or melting using a focused laser beam or by well known photolithographic methods as a series of openings along a circular or spiral track. Although in FIG. 1 the slots are shown as lying along a circular track they may be distributed in any desired manner in the masking layer. This structure provides radial tracking capability during recording and readout of information from the absorptive layer since the difference in the reflected light intensity from the masking layer and slots can be converted into an electrical signal proportional to the radial tracking error.

In FIG. 3 and subsequent figures, the identification of the common elements of the subject embodiment and previous embodiments of the invention are the same. The second embodiment 30 differs from the first embodiment 10 in that a reflective layer 32 is interposed between the subbing layer 14 and the absorptive layer 16 and an overcoat layer 36 overlies the masking layer 20.

The reflective layer 32 reflects a substantial fraction, preferably at least 50 percent, of the incident light at the wavelengths of the recording and readout light beams and can be a metal such as aluminum or gold or a single or multilayer dielectric reflector.

In this embodiment the thickness of the absorptive layer 16 is chosen so as to reduce and preferably to minimize the reflectivity of the recording medium in the slotted portions at the wavelength of the recording light beam. Typically the thickness is between about 5 and about 100 nanometers and depends upon the optical constants of the materials which constitutes the reflective, absorptive and buffer layers.

The overcoat layer 36, preferably between 0.5 and about 1 millimeter thick, serves to reduce signal defects caused by surface dust which precipitates from the environment onto the recording medium. Useful materials for this layer include silicone, acrylic or epoxy resins.

The third embodiment 40 of FIG. 4 differs from the second embodiment 30 in that a spacer layer 42 is interposed between the light reflective layer 32 and the absorptive layer 16.

The spacer layer 42 is substantially transparent and non-scattering at the wavelengths of the recording and readout light beams and may be an oxide of silicon, titanium, aluminum or magnesium deposited by electron beam evaporation. Alternatively, organic materials deposited by evaporation, spin coating or glow discharge deposition may be used.

The thicknesses of the spacer layer 42 and the absorptive layer 16 are so related to the optical constants of the reflective layer 32, the spacer layer 42, the absorptive layer 16 and the buffer layer 18 that the reflectivity of the recording medium in the slotted portions is reduced and preferably minimized at the wavelength of the recording light beam. The spacer layer 42 is typically between about 10 nanometers and about 150 nanometers thick. The absorptive layer 16 is typically between about 3 nanometers and about 40 nanometers thick.

Information is recorded in these media by exposure to a modulated recording light beam which can form a pit or a reversible change in the optical properties of the absorptive layer; for example, a change in the degree of crystallinity of the absorptive layer. Information may be encoded as a variation in the length or spacing of the regions of the absorptive layer so changed. Since the recording light beam will only penetrate with substantially unchanged intensity to the absorptive layer in those regions underlying the slots in the masking layer, recording will only occur in such regions unless the intensity and duration of the recording light beam is sufficient to first form an opening in the masking layer and then produce the necessary change in the absorptive layer. This latter effect is minimized by use of a material for the masking layer which has a higher sensitivity at the recording wavelength. Alternatively, for the recording medium 30 or 40 the thicknesses of the layers may be chosen so as to produce a low reflectivity at the recording wavelength and a high reflectivity at the wavelength of the light beam used to form the slots.

Figure 6:
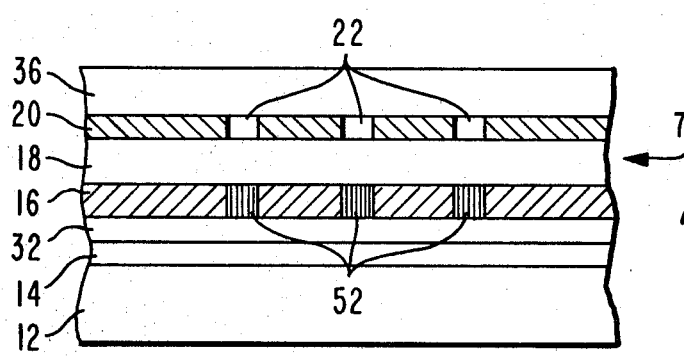
Figure 7:
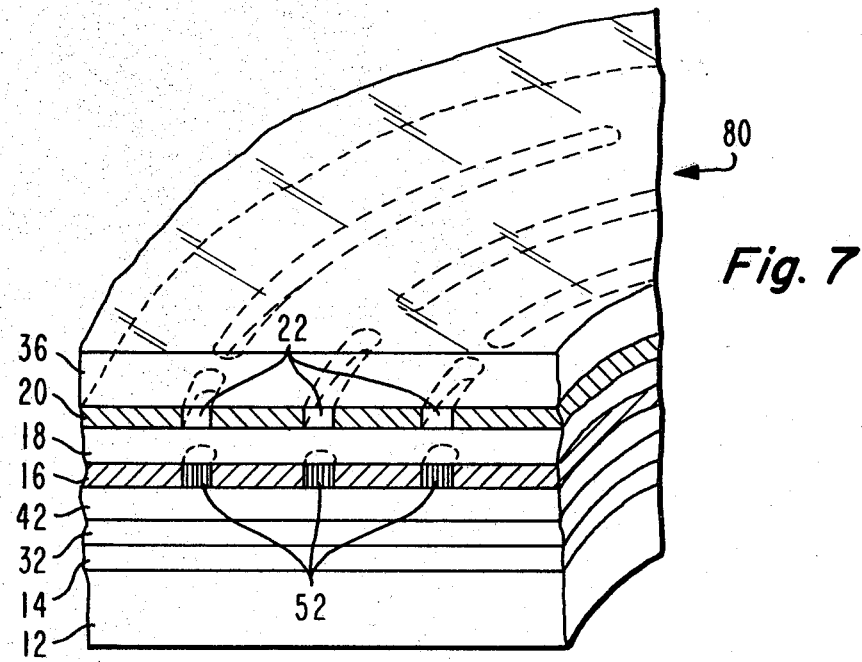

In FIGS. 5, 6 and 7 the information track comprises a series of regions 52 in the absorptive layer 16 underlying the slots 22 in the masking layer 20. The regions 52 have different optical properties from the unexposed portions of the absorptive layer 16 and are spaced apart from one another by unexposed regions 54.

EXAMPLE

A trilayer recording medium fabricated according to the principles of the invention included a polyvinylchloride substrate coated with an acrylic resin (FUTURE ™ acrylic finish manufactured by S. C. Johnson and Sons, Inc., Racine, Wis.) between 10 and 25 micrometers thick, an aluminum reflective layer 80 nanometers thick, a silicon dioxide spacer layer 62 nanometers thick, a tellurium light absorptive layer 5.5 nanometers thick, a silicon dioxide buffer layer 167 nanometers thick and a 30 nanometer thick tellurium masking layer. The medium was tested for its recording and readout properties in an optical system such as that disclosed by Spong, referred to above, which operated at a wavelength of 488 nanometers and had a focussed light beam spot size about 0.4 by about 0.6 micrometer in cross section. A slot along a spiral path was formed in the masking layer using a continuous wave incident light beam with about 10 milliwatts incident on the optical recording medium. An information track in the absorptive layer was then formed by recording an FM modulated video signal using a recording light beam having an incident power on the recording medium of about 20 milliwatts. Information tracks beneath the slots in the masking layer were observed using bright field optical microscopy.

I claim:
1. An optical recording medium comprising
   a substrate;
   an absorptive layer overlying the substrate which is absorptive of light at the wavelength of a recording light beam;
   a buffer layer overlying the absorptive layer; and
   a masking layer overlying the buffer layer and having one or more slots extending therethrough.
2. An information record comprising
   a substrate;
   an absorptive layer overlying the substrate which is absorptive of light at the wavelength of a recording light beam and which has an information track therein;
   a buffer layer overlying the absorptive layer; and
   a masking layer overlying the buffer layer and having one or more slots extending therethrough;
   wherein the information track comprises one or more regions of the absorptive layer underlying the slots in the masking layer which have different optical properties from the remainder of the absorptive layer.
3. The article according to claim 2 wherein the regions of the absorptive layer having different optical properties each have a pit in the absorptive layer.
4. The article according to claim 2 wherein the regions of the absorptive layer having different optical properties have a different degree of crystallinity from the remainder of the absorptive layer.
5. The article according to claim 1 or 2 wherein the thickness of the buffer layer is an integral multiple of one-half the wavelength of the recording light beam in the material of which the buffer layer is composed.

6. The article according to claim 1 or 2 wherein the thickness of the masking layer is between about 10 nanometers and about 100 nanometers.

7. The article according to claim 1 or 2 wherein an overcoat layer overlies the masking layer.

8. The article according to claim 1 or 2 wherein the absorptive and masking layers are composed of a material selected from the group consisting of titanium, rhodium, tellurium, selenium, alloys containing tellurium or selenium, and chalcogenide alloys.

9. The article according to claim 1 or 2 wherein a reflective layer is interposed between the substrate and the absorptive layer.

10. The article according to claim 9 wherein the thickness of the absorptive layer is so related to the optical constants of the reflective layer, the absorptive layer and the buffer layer that the reflectivity of the recording medium in the slotted portions at recording wavelength is reduced.

11. The article according to claim 9 wherein a spacer layer is interposed between the reflective layer and the absorptive layer.

12. The article according to claim 11 wherein the thicknesses of the absorptive layer and the spacer layer are so related to the optical constants of the reflective layer, the spacer layer, the absorptive layer and the buffer layer that the reflectivity of the optical recording medium in the slotted portions at the wavelength of the recording light beam is reduced.

* * * * *